United States Patent
Sy et al.

(10) Patent No.: US 8,380,390 B2
(45) Date of Patent: Feb. 19, 2013

(54) METHOD AND SYSTEM OF DETERMINING LOAD CHARACTERISTICS OF A TRAILER

(75) Inventors: Williamson Sy, Tokyo (JP); Doug Johnston, Plymouth, MI (US); Pascal Martin, Commerce Township, MI (US); Damian Nowicki, Grayling, MI (US)

(73) Assignee: Robert Bosch GmbH, Stuttgart (DE)

( * ) Notice: Subject to any disclaimer, the term of this patent is extended or adjusted under 35 U.S.C. 154(b) by 908 days.

(21) Appl. No.: 12/490,856

(22) Filed: Jun. 24, 2009

(65) Prior Publication Data
US 2010/0332049 A1 Dec. 30, 2010

(51) Int. Cl.
*B60D 1/30* (2006.01)

(52) U.S. Cl. ............ 701/36; 701/48; 701/124; 280/400; 280/515; 340/431

(58) Field of Classification Search ............... 701/1, 36, 701/41, 48, 49, 50, 69, 124; 340/431, 440; 280/455.1, 400, 504, 515, 432
See application file for complete search history.

(56) References Cited

U.S. PATENT DOCUMENTS

| | | | |
|---|---|---|---|
| 3,695,096 A | 10/1972 | Kutsay | |
| 4,165,637 A | 8/1979 | Kooman | |
| 4,576,053 A * | 3/1986 | Hatamura | 73/862.629 |
| 4,793,193 A * | 12/1988 | Borgudd | 73/862.043 |
| 5,684,254 A | 11/1997 | Nakazaki et al. | |
| 5,811,738 A | 9/1998 | Boyovich et al. | |
| 6,053,521 A * | 4/2000 | Schertler | 280/511 |
| 6,196,327 B1 * | 3/2001 | Patel et al. | 172/7 |
| 6,408,688 B2 | 6/2002 | Foley et al. | |
| 6,769,315 B2 | 8/2004 | Stevenson et al. | |
| 6,859,753 B1 | 2/2005 | Thakur et al. | |
| 7,394,354 B2 | 7/2008 | Yu | |
| 7,561,953 B2 | 7/2009 | Yu | |
| 7,577,506 B2 | 8/2009 | Fleet | |

(Continued)

FOREIGN PATENT DOCUMENTS

| | | |
|---|---|---|
| JP | 8254456 | 10/1996 |
| WO | 2008/086283 | 7/2008 |

OTHER PUBLICATIONS

Robert Bosch GmbH—Automotive Equipment, "Intelligent Bolt: Bosch "iBolt" Seat Occupancy Sensor System for Modified Airbag Release", available online at: <http://www.bosch-presse.de/TBWebDB/en-US/Presstext.cfm?CFID=6412935&CFTOKEN=85022dff766e23e1-77E2EFA0-E4F5-A479-C6C8299D3E4805E2&Search=1&id=1962>, Jun. 2004.

(Continued)

*Primary Examiner* — Khoi Tran
*Assistant Examiner* — Spencer Patton
(74) *Attorney, Agent, or Firm* — Michael Best & Friedrich LLP

(57) ABSTRACT

A system and method for determining characteristics of a trailer being towed by a vehicle. The trailer is coupled to the vehicle using a trailer hitch using at least one intelligent bolt or fastener. The intelligent fastener has structural characteristics similar to those of traditional bolts for fastening a trailer to a vehicle (e.g., shear strength, diameter, etc.), but the intelligent fastener is configured to sense forces at a junction between the trailer and the vehicle. An ESC system receives force readings from the intelligent fastener sensors along with signals from a plurality of other sensors and determines one or more characteristics of the trailer. The ESC system compensates the motion of the vehicle based on the forces sensed at the junction and the characteristics of the trailer.

20 Claims, 8 Drawing Sheets

U.S. PATENT DOCUMENTS

| | | | |
|---|---|---|---|
| 2006/0206253 A1* | 9/2006 | Yu | 701/70 |
| 2006/0290102 A1 | 12/2006 | VanBuskirk, Jr. | |
| 2008/0036296 A1 | 2/2008 | Wu et al. | |
| 2010/0007200 A1 | 1/2010 | Pelosse | |
| 2011/0022282 A1 | 1/2011 | Wu | |
| 2011/0029210 A1 | 2/2011 | Wu | |
| 2011/0040451 A1 | 2/2011 | Lee | |

OTHER PUBLICATIONS

Strainsert, Load Pin and Bolt Overview, available online at: <http://www.strainsert.com/pages/load-pins-overview.php>, Copyright 2009 Strainsert, Inc., available at least as early as Feb. 10, 2009.

Materials Handling, Load Pins for In-Vehicle Measurements, available online at: <http://mathandling.com.au/article/load-pins-for-in-vehicle-measurements/240383.aspx>, Oct. 8, 2008.

* cited by examiner

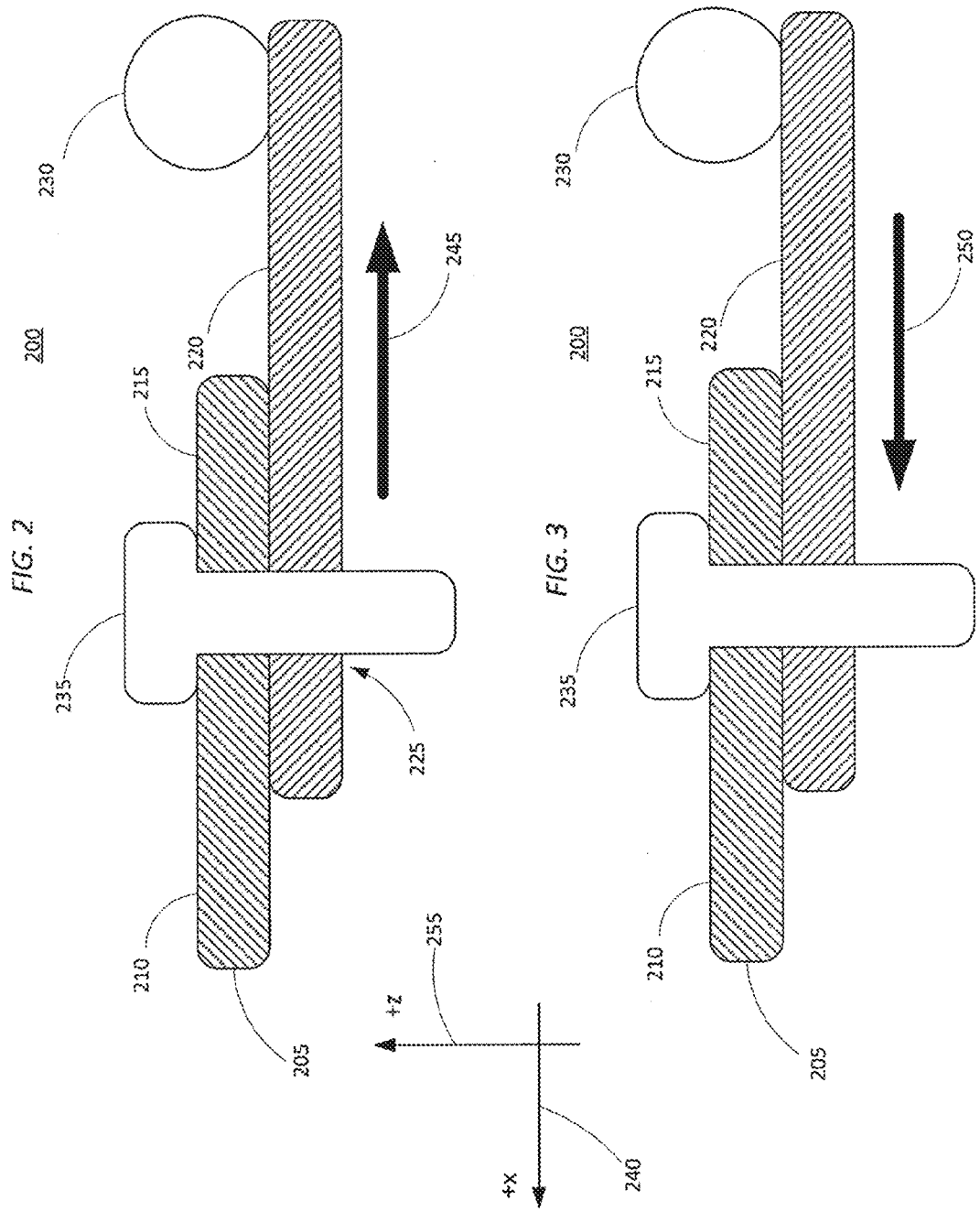

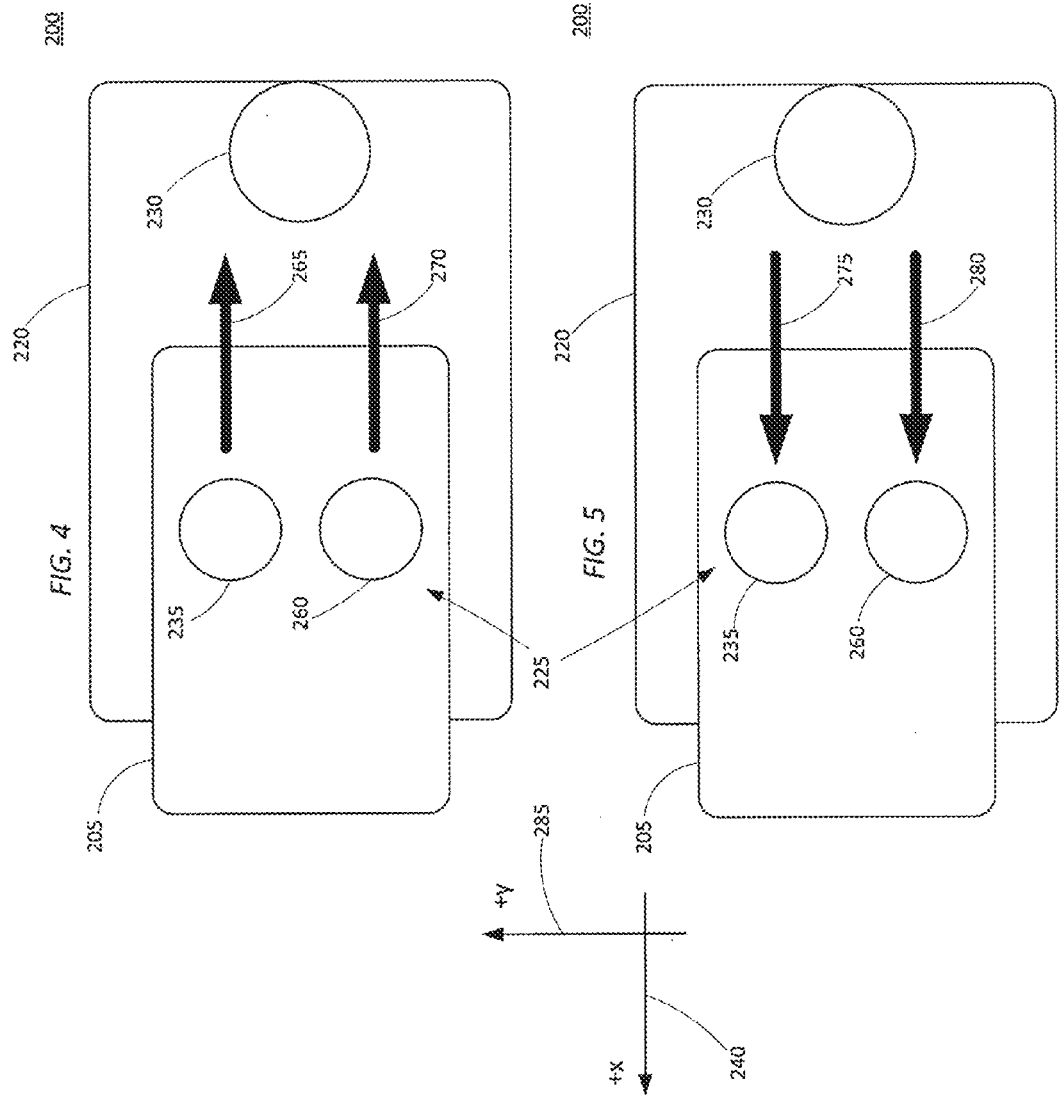

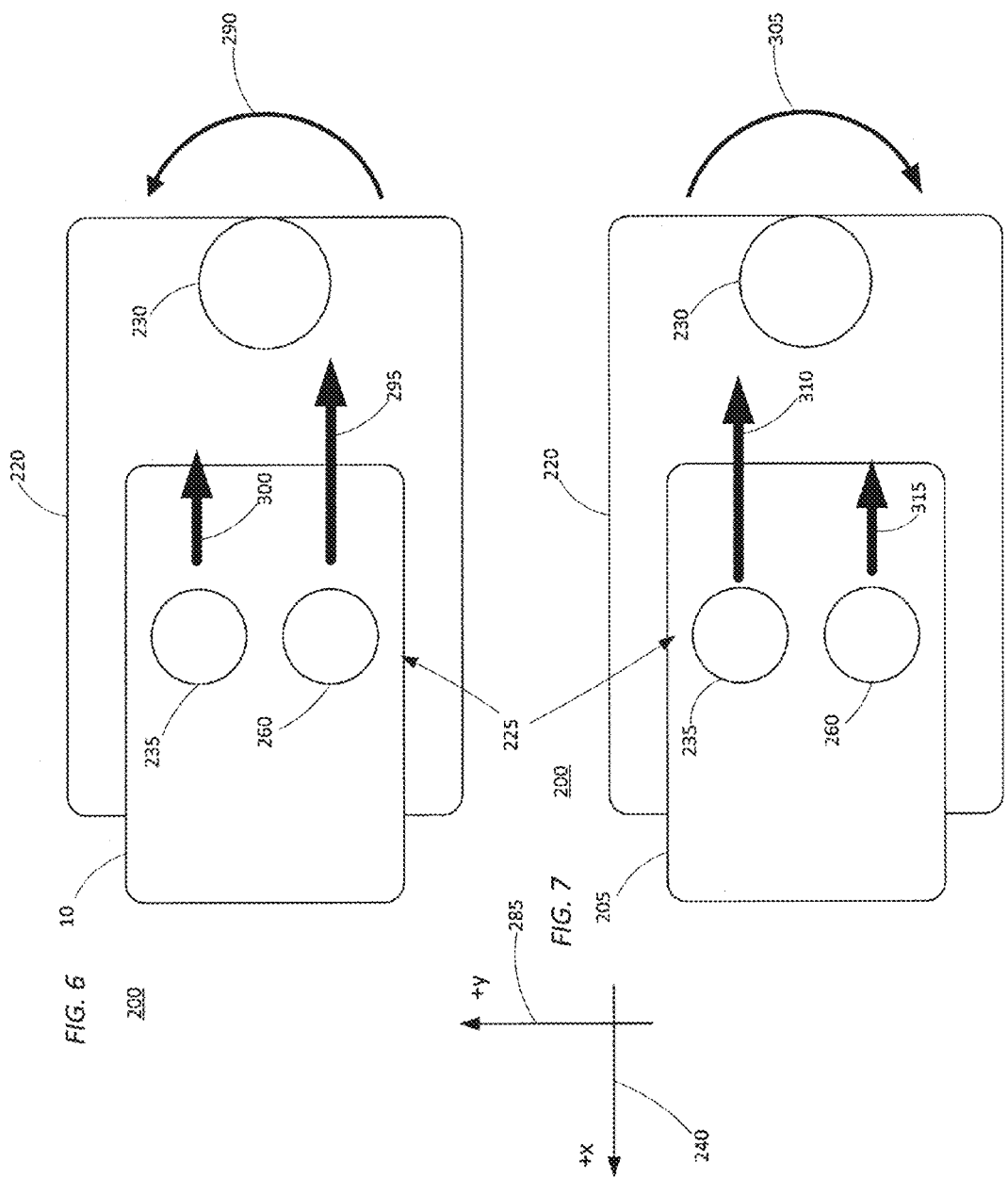

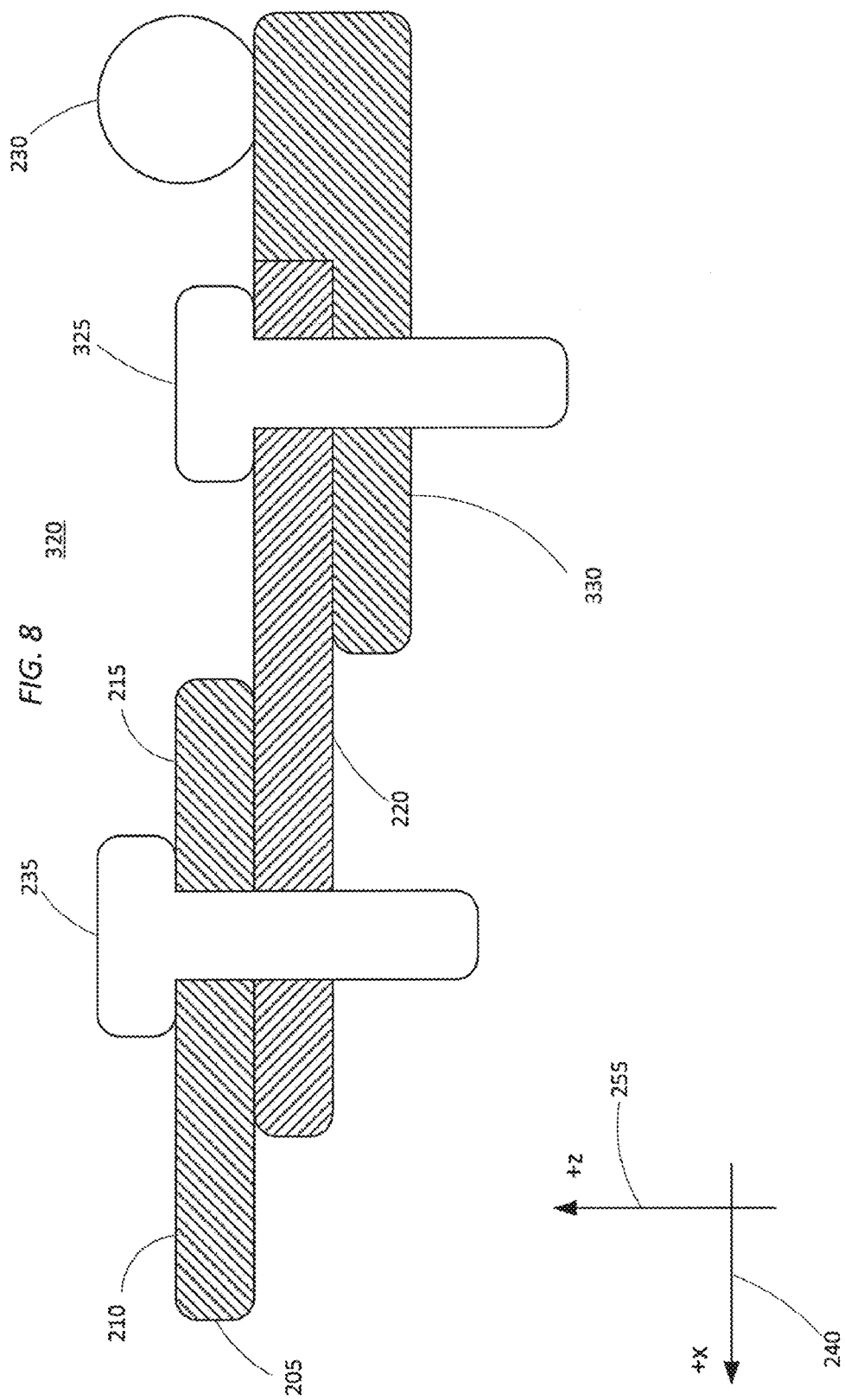

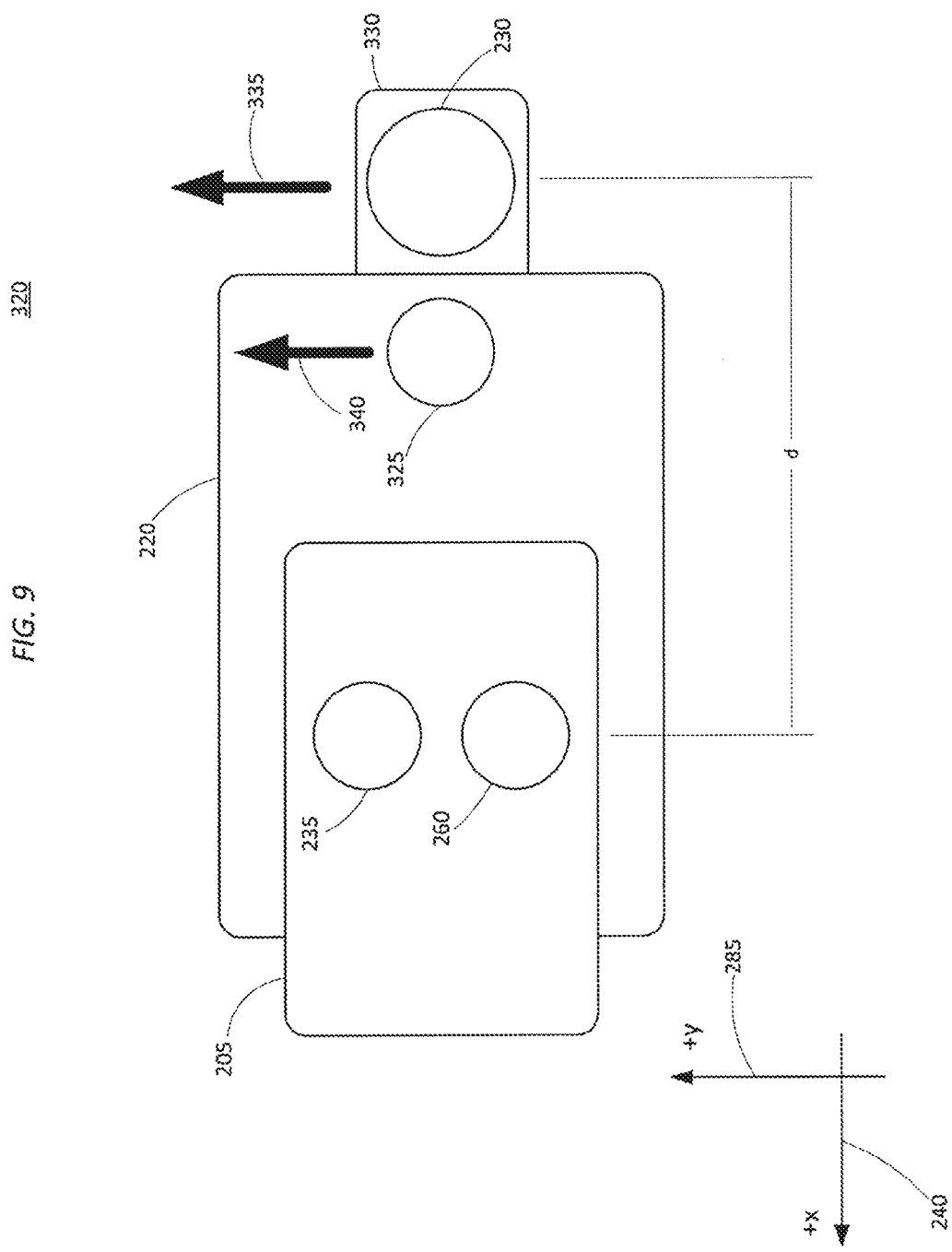

METHOD AND SYSTEM OF DETERMINING LOAD CHARACTERISTICS OF A TRAILER

BACKGROUND

Embodiments of the invention relate to a method and system for determining load characteristics of a trailer that is being towed by a vehicle.

Vehicle stability is a concern when towing a trailer, especially when the vehicle towing the trailer is traveling at high speeds or making a turn. Since the trailer significantly affects the dynamics of the vehicle, control systems use techniques to improve the stability of the vehicle especially when a trailer is present. For example, systems such as anti-lock braking systems ("ABS"), traction control systems ("TCS"), and vehicle dynamics control ("VDC") systems are configured to perform a variety of functions to improve the stability of the vehicle and the trailer.

SUMMARY

The invention provides systems and methods for determining characteristics of a trailer being towed by a vehicle that includes an electronic stability control ("ESC") system. The trailer is coupled to the vehicle at a trailer hitch. The hitch is configured to fasten the trailer to the vehicle using at least one intelligent bolt or fastener, such as an iBolt™. The intelligent fastener has structural characteristics similar to those of traditional bolts for fastening a trailer to a vehicle (e.g., shear strength, diameter, etc.), but the intelligent fastener is configured to measure the longitudinal, lateral, or rotational forces at a junction of the trailer hitch and the vehicle. The intelligent fastener includes sensors, electronics, and electrical connectors such that the intelligent fastener outputs a signal or signals to the ESC system indicative of the forces between the trailer and the vehicle. The signals are received by the ESC system and used in conjunction with additional signals from a plurality of other sensors connected to the ESC system to determine one or more characteristics of the trailer. The characteristics of the trailer include a trailer weight, a trailer sway, and a trailer center of gravity. In some embodiments, the ESC system is configured to calculate additional characteristics of the trailer such as a wind resistance geometric profile of the trailer and a resistive force experienced by the trailer's tires.

In one embodiment, the invention provides a method of determining a plurality of characteristics of a trailer being towed by a vehicle that includes an ESC system. The method includes sensing a plurality of vehicle conditions using sensors connected to the electronic stability control system, measuring a first force at a first hitch point or junction of a trailer hitch, and measuring a second force at the first hitch point. An intelligent fastener, such as an iBolt™, is located at or near the hitch point. The first and second forces are in a longitudinal direction with respect to the vehicle. The ESC system then determines a first characteristic of the trailer based on the first force and the second force, and compensates the motion of the vehicle based on the first characteristic of the trailer and the plurality of vehicle conditions.

In another embodiment, the invention provides a system for determining a plurality of characteristics of a trailer being towed by a vehicle that includes an ESC or other control system. The trailer-characteristic-determination system includes a plurality of sensors configured to sense a plurality of conditions of the vehicle. A first fastening device is configured to measure a first longitudinal force and a second longitudinal force at a first junction between the vehicle and a trailer. The ESC system receives signals indicative of the first and second forces from the first fastening device, and signals from the plurality of sensors that are indicative of the plurality of conditions of the vehicle. The ESC system determines a first characteristic of the trailer based on the first force and the second force and compensates the motion of the vehicle based on the first characteristic of the trailer and the plurality of vehicle conditions.

In another embodiment, the invention provides a method of determining a plurality of characteristics of a trailer being towed by a vehicle that includes an ESC system. The method includes sensing a plurality of vehicle conditions using sensors connected to the electronic stability control system, measuring a first force at a first fastenable junction between the vehicle and a trailer, and measuring a second force at the first fastenable junction between the vehicle and the trailer. The first and second forces are in a longitudinal direction with respect to the vehicle. The ESC system then determines a first characteristic of the trailer based on the first force and the second force, and compensates the motion of the vehicle based on the first characteristic of the trailer and the plurality of vehicle conditions.

Other features and advantages of the invention will become apparent to those skilled in the art upon review of the following detailed description, claims, and drawings.

BRIEF DESCRIPTION OF THE DRAWINGS

FIG. 2 is a side view of a hitch point or junction between a vehicle and a trailer showing the force exerted on a bolt at the junction during vehicle acceleration.

FIG. 3 is a side view of the junction between the vehicle and the trailer showing the force exerted on the bolt at the junction during vehicle deceleration.

FIG. 4 is a top view of the junction between the vehicle and the trailer showing the forces exerted on first and second bolts at the junction during vehicle acceleration.

FIG. 5 is a top view of the junction between the vehicle and the trailer showing the forces exerted on the first and second bolts at the junction during vehicle deceleration.

FIG. 6 is a top view of the junction between the vehicle and the trailer showing a first difference in forces exerted on the first and second bolts at the junction.

FIG. 7 is a top view of the junction between the vehicle and the trailer showing a second difference in forces exerted the on first and second bolts at the junction.

FIG. 8 is a side view of a junction between the vehicle and the trailer according to an embodiment of the invention.

FIG. 9 is a top view of a junction between the vehicle and the trailer according to an embodiment of the invention.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to a system and method for determining characteristics (e.g., load characteristics) of a trailer that is being towed by a vehicle that includes an electronic stability control ("ESC") system. The trailer is coupled to the vehicle using a trailer hitch. The hitch is fastened to the vehicle at a junction or hitch point using at least one intelligent bolt or fastener sensor. Examples of intelligent fasteners that may be used in embodiments of the invention are described in U.S. Pat. No. 6,859,753. The intelligent fastener has structural characteristics similar to those of traditional bolts for fastening a trailer to a vehicle (e.g., shear strength, diameter, etc.), but the intelligent fastener is configured to measure the forces at the junction between the trailer and the vehicle. The intelligent fastener includes electronics and electrical connectors such that the intelligent fastener outputs a signal or signals to the ESC system indicative of the forces between the trailer and the vehicle. The signals are received by the ESC system and used in conjunction with signals from a plurality of vehicle sensors connected to the ESC system to determine one or more characteristics of the trailer. In some embodiments, the characteristics of the trailer include a trailer weight, a trailer sway, and a trailer center of gravity. In other embodiments, the ESC system is configured to calculate additional characteristics of the trailer such as a wind-resistance-geometric profile of the trailer and a resistive force experienced by the trailer's tires.

Figure 1:
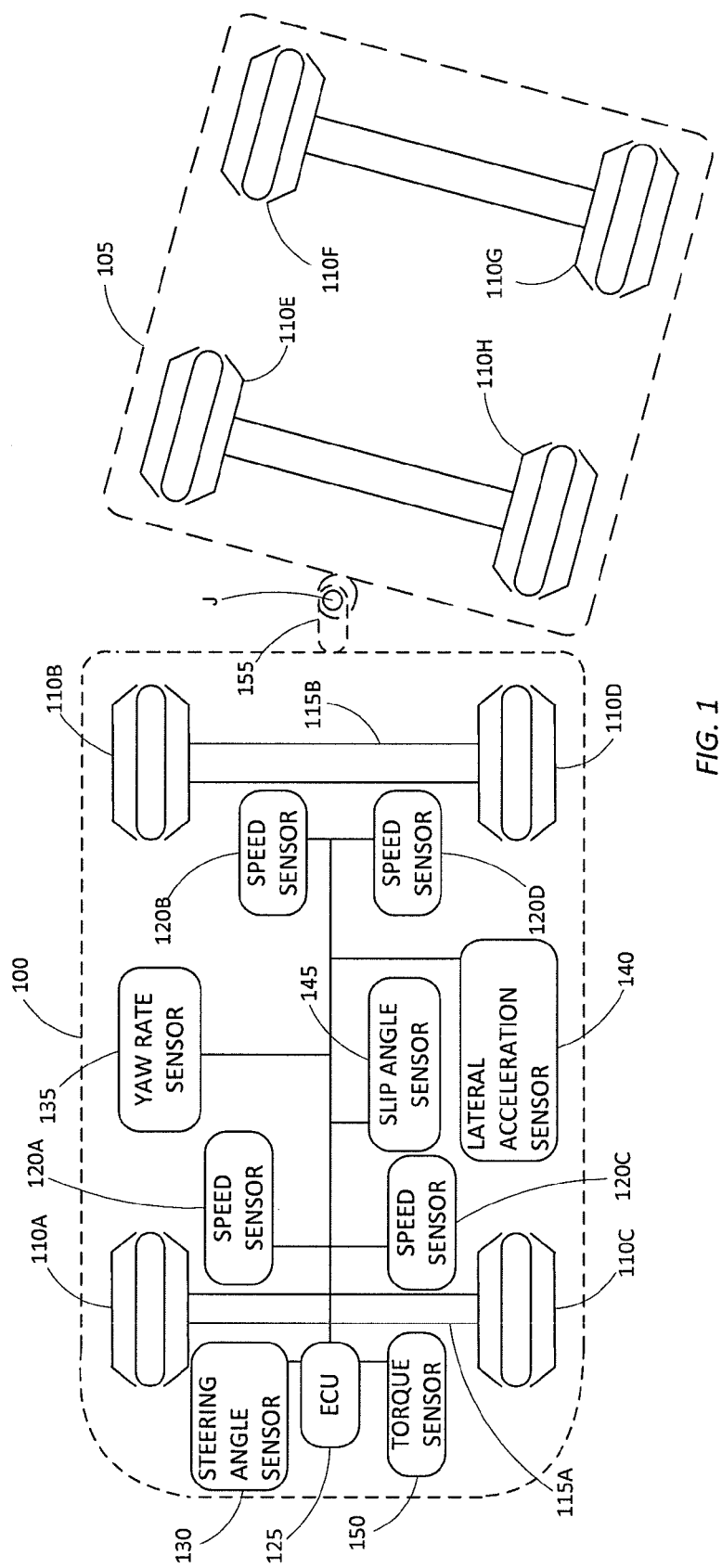
FIG. 1 schematically illustrates a vehicle that includes an electronic stability control ("ESC") system and a trailer hitched to the vehicle.

FIG. 1 is a diagram of a vehicle 100 towing a trailer 105. The vehicle 100 has four wheels 110A, 110B, 110C and 110D, and the trailer 105 has four wheels 110E, 110F, 110G and 110H. In some embodiments, the vehicle 100 and the trailer 105 can have other numbers of wheels, and the trailer 105 is a semi-trailer, a full-size trailer, a boat trailer, a camper, or the like. The wheels 110A, 110B, 110C, and 110D are connected to axles 115A and 115B, as shown. The wheels are monitored by a plurality of wheel speed sensors 120A, 120B, 120C, and 120D. The wheel speed sensors 120A, 120B, 120C, and 120D are coupled to an electronic control unit ("ECU") 125. The vehicle 100 also includes other sensors such as a steering angle sensor 130, a yaw rate sensor 135, and a lateral acceleration sensor 140. The wheel speed sensors 120A, 120B, 120C, and 120D, the steering sensor 130, the yaw rate sensor 135, and the lateral acceleration sensor 140 are shown as individual sensors. In other embodiments, these sensors include multiple sensors in a plurality of sensor arrays that are coupled to the ECU 125. Other sensors such as a body slip angle sensor 145 and an engine torque sensor 150 are also included in the vehicle 100. The vehicle 100 also includes a hitch 155 for coupling the vehicle 100 to the trailer 105.

A compensation system (described below) is connected to the ECU 125 and generates signals to control compensating actions in response to sensed or calculated characteristics of the vehicle 100 or the trailer 105. In one embodiment, an array of vehicle sensors includes wheel speed sensors 120A, 120B, 120C, and 120D, the steering angle sensor 130, the yaw rate sensor 135, and the lateral acceleration sensor 140. The sensor array detects and monitors specific conditions of the vehicle 100. In other embodiments, the towing vehicle sensor array includes the body slip angle sensor 145. The sensors 120A, 120B, 120C, and 120D sense conditions of the vehicle indicative of the movement or speed of the vehicle 100. The sensed conditions are transduced and converted into calibrated signals indicative of the acceleration of the vehicle 100. In some embodiments, the sensors 120A, 120B, 120C, and 120D are equipped with calibration circuitry or microprocessors such that the sensed speeds are converted to a calibrated form internally to the sensors 120A, 120B, 120C, and 120D. In other embodiments, the sensed values are converted into calibrated signals external to the sensors in another suitable manner. Other sensors, such as the steering sensor 130, the yaw rate sensor 135, and the lateral acceleration sensor 140, are used to detect, for example, side-to-side movements, side-to-side accelerations, and vehicle angles. Collectively, values of the signals outputted by the sensors 120A, 120B, 120C, 120D, 130, 135, 140, or by the sensor array are referred to as sensed values, or values, herein. The ECU 125, the sensors or sensor array, and the compensation system are also collectively referred to herein as the ESC system.

The trailer 105 is coupled to the vehicle 100 using the trailer hitch 155. The hitch 155 is fastened to the vehicle 100 using one or more intelligent fastener sensors at a hitch point or junction, J. FIGS. 2 and 3 illustrate a side view of a trailer hitch 200 between the vehicle 100 and the trailer 105 which is similar to trailer hitch 155. The trailer hitch 200 includes a first connecting portion 205 having first and second ends 210 and 215. The first end 210 is coupled to the vehicle 100 and the second end 215 is coupled to a second connecting portion 220. The first connecting portion 205 and the second connecting portion 220 are coupled at a first junction 225, and the second connecting portion 220 includes a trailer hitch ball 230 at an end opposite the first junction 225. The trailer hitch 200 of FIGS. 2 and 3 is shown in cross-section to illustrate the first junction 225 between the first connecting portion 205 and the second connecting portion 220. The first junction 225 includes a first intelligent fastener 235 for coupling the first connecting portion 205 to the second connecting portion 220. The intelligent fastener 235 includes at least one sensor (e.g., a Hall sensor, a force-dependent resistor, a piezoresistor, or the like) for measuring forces at the first junction 225. In some embodiments, the intelligent fastener 235 measures forces 245 and 250 along an x-axis 240 (i.e., longitudinally with respect to the vehicle 100). In other embodiments, the intelligent fastener 235 is configured to measure forces in along a z-axis 255 (i.e., vertical forces), or forces in along a y-axis 285 (i.e., transversely with respect to the vehicle 100), as shown in FIGS. 4 and 5.

FIG. 2 illustrates a driving situation in which the vehicle 100 is accelerating along the x-axis 240 in the +x direction. The force 245 from the vehicle 100 accelerating in the +x direction results in a net longitudinal force on the intelligent fastener 235 from the trailer 105 in the −x direction. For example, the net longitudinal force is a summation of the forces which act on the intelligent fastener 235 as a result of characteristics of the trailer 105, which include the weight of the trailer 105, the wind resistance of the trailer 105, and the friction between the trailer wheels and the road surface (e.g., asphalt, concrete, gravel, etc.). FIG. 3 illustrates the trailer hitch 200 experiencing a force 250 in the +x direction (e.g., from the vehicle 100 decelerating). When the vehicle 100 decelerates, the trailer 105 generates the force 250 on the intelligent fastener in the +x direction. In a decelerating vehicle situation, the forces acting on the trailer 105 (e.g., wind resistance, tire friction, trailer weight, etc.) lessen or dampen the longitudinal force 250 exerted on the intelligent fastener 235 in the +x direction. In the embodiments illustrated in FIGS. 2 and 3, torques and lateral forces caused by, for example, crosswinds or turning, which affect the output of the intelligent fastener 235, are ignored, and the motion of the vehicle-trailer combination is assumed to be solely in the +x or −x direction. The affects of forces in other directions such as along a y-axis, are discussed in greater detail below with respect to subsequent figures.

The forces at the first junction 225 vary continuously when the vehicle 100 is moving and the ESC system continuously compensates vehicle control and motion based on the force readings from the intelligent fastener 235. The intelligent fastener 235 is configured to output a signal indicative of the net force it experiences. In some embodiments, the intelligent fastener 235 averages a force over a time period (e.g., one milli-second) and outputs a mean value for the net force. In other embodiments, the ESC system calculates a mean value or mean values for the forces experienced by the intelligent fastener 235 before any ESC system compensation is performed. In some embodiments, the output signal from the intelligent fastener 235 is analog and is received by the ESC system as long as the ESC system is powered (e.g., as long as the vehicle 100 is turned on), and the ESC system samples the analog signal at a predetermined frequency (e.g., 1000 samples per second). In other embodiments, the ESC system samples the intelligent fastener 235 output signal at a rate that is proportional to the speed of the vehicle 100, because the affects of towing the trailer 105 on the stability of a vehicle 100 are often greater at higher speeds. Alternatively, the intelligent fastener 235 provides a digital signal to the ESC system at a predetermined sample rate.

FIGS. 4 and 5 illustrate a top view of a trailer hitch 200 when the vehicle 100 is accelerating and decelerating, respectively. The trailer hitch 200 includes the first connecting portion 205 and the second connecting portion 220 described above for coupling the trailer 105 to the vehicle 100. The first connecting portion 205 and the second connecting portion 220 are coupled at the first junction 225 using first and second intelligent fasteners 235 and 260. In FIG. 4, the trailer 105 exerts forces 265 and 270 on the first and second intelligent fasteners 235 and 260 in the −x direction. In FIG. 5, the trailer 105 exerts forces on the first and second intelligent fasteners 235 and 260 in the +x direction. When the vehicle 100 is accelerating uniformly (i.e., purely in the +x or −x direction) and no forces (e.g., a crosswind) act on the trailer 105 along a y-axis in the +y or −y direction, the force is distributed between the first and second intelligent fasteners 235 and 260 such that each intelligent fastener senses approximately half of the trailer load. However, when the vehicle 100 is not accelerating purely in the longitudinal direction or a force such as a crosswind causes the trailer 105 to sway, the trailer load is not evenly distributed between the first and second intelligent fasteners 235 and 260, and a difference between the forces sensed by the first and second intelligent fasteners 235 and 260 develops.

FIGS. 6 and 7 illustrate a driving situation in which the first and second intelligent fasteners 235 and 260 sense different forces. The magnitude of the sensed forces, or the magnitude of the difference between the sensed forces, is used by the ECU 125 to monitor the characteristics of the trailer 105 when the vehicle 100 is turning, and compensates the ESC system accordingly. For example, FIG. 6 illustrates a driving situation in which the vehicle 100 is turning in the +y direction. As the vehicle 100 turns, the trailer 105 experiences a counterclockwise rotation 290 with respect to the trailer hitch 200. The rotation 290 results in the sensed force 295 of the second intelligent fastener 260 being greater than the sensed force 300 of the first intelligent fastener 235. In a similar manner, when the vehicle 100 is turning in the −y direction (FIG. 7), the trailer 105 experiences a clockwise rotation 305 with respect to the trailer hitch 200. As a result of the clockwise rotation 305, the force 310 sensed by the first intelligent fastener 235 is greater than the force 315 sensed by the second intelligent fastener 260. As described in greater detail below, the ECU 125 uses the forces sensed by the first and second intelligent fasteners 235 and 260 and the differences between the forces sensed by the first and second intelligent fasteners 235 and 260 to compensate the motion of the vehicle 100.

FIGS. 8 and 9 illustrate a trailer hitch assembly 320 that includes the first and second intelligent fasteners 235 and 260 (described above with respect to FIGS. 4-7) as well as a third intelligent fastener 325 which is positioned between the first and second intelligent fasteners 235 and 260 and the trailer hitch ball 230. The third intelligent fastener 325 couples the second connecting portion 220 to a third connecting portion 330. The third connecting portion 330 is, for example, a detachable portion of the trailer hitch assembly 320 which is detached from the vehicle 100 when no trailer is being towed. The third intelligent fastener 325 is used in combination with the first and second intelligent fasteners 235 and 260 to determine characteristics of the trailer 105. In the embodiments of the invention that include the third intelligent fastener 325, the third intelligent fastener 325 is primarily used to determine a torque or to detect a torsion which results from a torque. The torque results from the trailer weight and other characteristics of the trailer previously described when, for example, the vehicle 100 is turning.

The cross-sectional view of FIG. 8 illustrates the interconnections between the first, second, and third connecting portions 205, 220, and 330. The forces caused by the trailer 105 are distributed among each of the first, second, and third intelligent fasteners 235, 260, and 325. The first and second intelligent fasteners 235 and 260 function in a manner similar to that described above with respect to FIGS. 2-7. The third intelligent fastener 325 is positioned and configured for determining the torque exerted on the trailer hitch 320 by the trailer 105. For example, the torque results from a force being applied a particular distance, d, away from a fulcrum (FIG. 9). In the illustrated embodiment, of the trailer hitch 320 the first and second intelligent fasteners 235 and 260 function as the fulcrum, or the point at which the trailer hitch 320 would pivot if it were not rigidly secured to the vehicle 100 using the intelligent fasteners. The force 335 exerted on the trailer hitch ball 230 is approximately the same as the force 340 measured by the third intelligent fastener 325 in the +y direction. For example, the third intelligent fastener 325 is positioned as close to the trailer hitch ball 230 as possible to minimize the difference between the force 340 sensed by the intelligent fastener and the actual force 335 at the trailer hitch ball 230. In some embodiments, the third intelligent fastener 325 is incorporated into the trailer hitch ball 230. As such, the trailer hitch ball 230 is coupled to the second or third connecting portion 220 or 330 using the third intelligent fastener 325. Based on the forces sensed by the third intelligent fastener 325 and the distance between the third intelligent fastener 325 and the first and second intelligent fasteners 235 and 260, an applied torque is calculated by the ECU 125. In some embodiments, the distance, d, is estimated based on a typical length of a trailer hitch. In other embodiments, the intelligent fasteners communicate with each other (e.g., using Bluetooth or RF signals) to determine a separation distance between them.

Based on the information gathered by the ESC system related to the motion of the vehicle 100, and the information from the one or more intelligent fastener sensors related to the forces at the first junction 225 of the trailer hitch, the ESC system determines a plurality of characteristics related to the vehicle 100 and the trailer 105. The characteristics related to the trailer 105 are determined based on an analysis of the force readings received from the intelligent fastener sensors and, in some instances, information from other vehicle sensors. The force readings are used to calculate trailer characteristics based on various models of trailer motion. In some embodiments, certain factors which affect the force sensed at the first junction 225 of the trailer hitch are ignored as being insignificant with respect to the stability and motion of the vehicle 100. That is, these factors do not have a significant impact on the stability of the vehicle 100 or the force sensed at the first junction 225. In such embodiments, a metric is incorporated into the ESC system to determine whether certain factors should be considered in the calculations based on the forces sensed by the intelligent fasteners. The metric uses, for example, a calculation of the percentage of the force that is contributed by a particular factor. If the calculated percentage is below, for example, 0.1% of the force experienced at the first junction, the factor is ignored. In other embodiments, the ESC system is configured to only calculate a predefined or manufacturer designated set of factors to simplify the calculations required in the ESC system.

Figure 10:
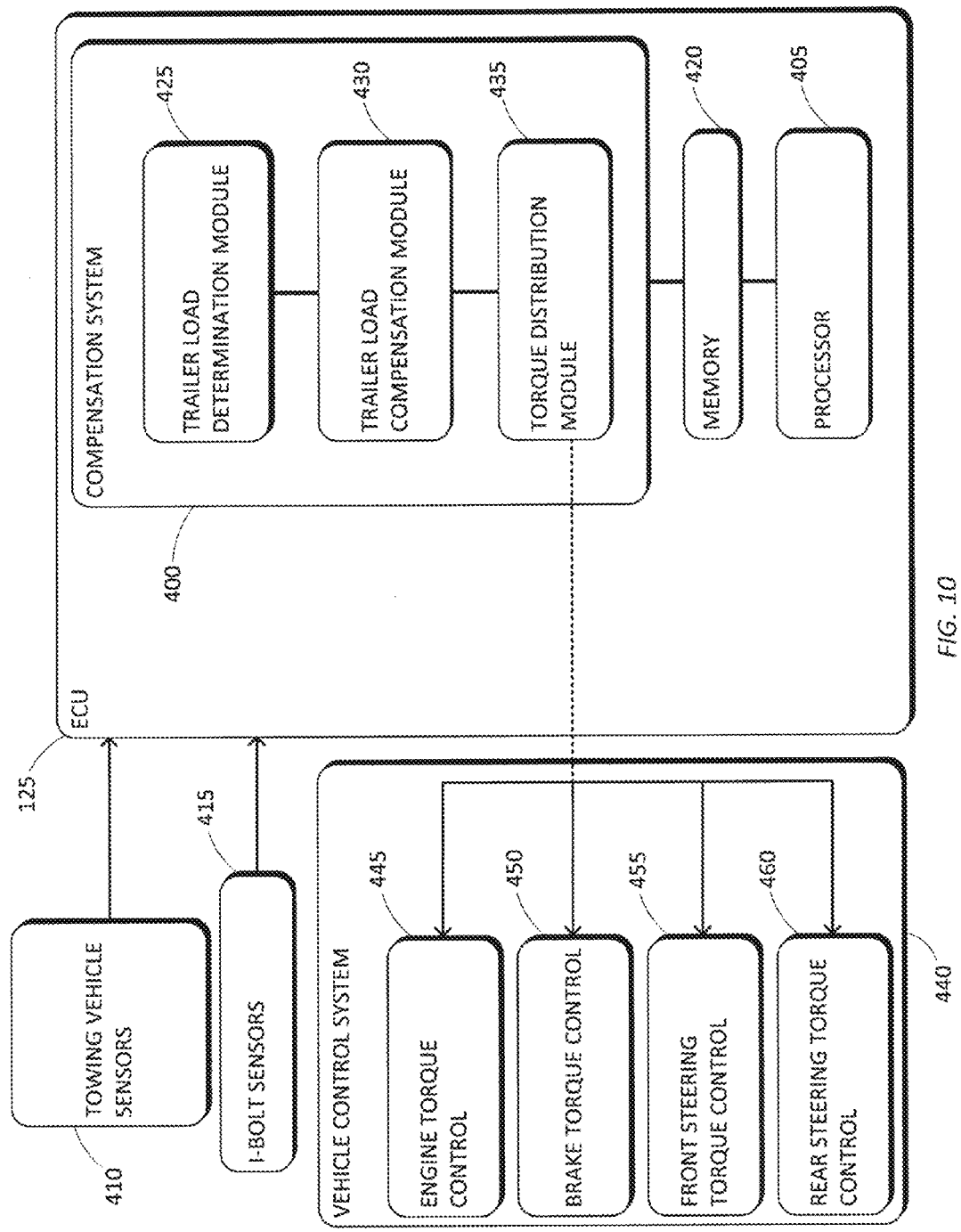
FIG. 10 is a block diagram of a compensation system for the vehicle of FIG. 1 according to an embodiment of the invention.

In the embodiments described herein, the ESC system is configured to calculate a predefined set of trailer characteristics that influence the forces sensed at the first junction 225. The characteristics include, for example, trailer wind resistance, trailer tire condition, trailer sway, and trailer center of gravity. Based on the calculated characteristics, the ESC system compensates the motion of the vehicle 100 for the affects of the trailer 105. As illustrated in FIG. 10, the ECU 125 of the ESC system includes a compensation system 400, a processor 405 that receives the values from a vehicle sensor array 410 and the intelligent fastener sensors 415 (i.e., the first, second, and third intelligent fastener sensors 235, 260, and 325). The processor 405 then processes the values from the vehicle sensor array 410 and the intelligent fastener sensors 415 according to a program stored in a memory 420. The processor 405 is a general-purpose micro-controller, a general-purpose microprocessor, a dedicated microprocessor or controller, a signal processor, an application-specific-integrated circuit ("ASIC"), or the like. In some embodiments, the compensation system 400 and its functions are implemented in a combination of firmware, software, hardware, and the like. In the illustrated embodiment, the processor 405 communicates with the compensation system 400 assuming that these modules are implemented in hardware. However, the functionality of these modules can be implemented in software, and that software can, for example, be stored in the memory 420 and executed by the processor 405.

The compensation system 400 includes a trailer load determination module 425, a trailer load compensation module 430, and a torque distribution module 435. The trailer load determination module 425 is used to determine and store characteristics of the trailer 105, the trailer load compensation module 430 is used to calculate a compensation factor or signal to compensate the motion of the vehicle 100 for the affects of the trailer 105, and the torque distribution module 435 uses the compensation factor or signal to generate one or more torque control signals to be sent to a vehicle control system 440. The vehicle control system 440 includes an engine torque control module 445 that controls engine torque, a brake torque control module 450 that controls the application a brake, for example, by releasing a brake fluid that further applies pressure to a brake caliper, which applies a brake force, a front steering torque control module 455 that controls a front steering torque, and a rear steering torque control module 460 that controls a rear steering torque.

The signals received by the ESC system from the one or more intelligent fastener sensors 415 are stored in the memory (e.g., RAM) 420 of the ECU 125. The processor 405 fetches the stored force readings from the memory 420 to perform calculations. In some embodiments, the processor 405 retrieves a plurality of stored force readings from the memory 420 and compares them based on other conditions of the vehicle 100. For example, the processor compares two force readings from the intelligent fastener sensors 415 which were taken when the trailer 105 was experiencing different vehicle acceleration conditions, such as a first reading during an acceleration condition and a second reading during a deceleration condition. The difference between force readings during these driving conditions is used to determine the weight of the trailer 105. For example, the weight of the trailer 105 is determined using the relationships shown as EQNS. 1 and 2. EQN. 1 shows a summation of the forces exerted on the intelligent fasteners 415 when the vehicle 100 is accelerating at $0.1*g$, where 'g' is the acceleration due to gravity and is assumed to have a value of approximately 9.81 m/s$^2$.

$$D = -A + B + C \qquad \text{EQN. 1}$$

where D is the sum of the forces on the intelligent fasteners 415 as a result of the trailer 105, A is the inertial resistance of the trailer 105 in the $-x$ direction and is approximately equal to $0.1*g*$(trailer weight), B is the wind resistance of the trailer 105, and C is the trailer 105 tire resistance (e.g., from friction).

A similar summation is performed when the vehicle 100 is decelerating at $0.1*g$ and is shown in EQN. 2.

$$E = A + B + C \qquad \text{EQN. 2}$$

where E is the sum of the forces on the intelligent fasteners 415, A is the inertial resistance of the trailer 105 in the $+x$ direction and is approximately equal to $0.1*g*$(trailer weight), B is the wind resistance of the trailer 105, and C is the trailer 105 tire resistance (e.g., from friction). Taking the difference between D and E results in EQN. 3 below $$\begin{aligned} D - E &= (-A + B + C) - (A + B + C) \qquad \text{EQN. 3} \\ &= -2A \\ &= -2 * 0.1 * g * (\text{trailer weight}) \end{aligned}$$

As such, the weight of the trailer 105 is determined from the two force measurements when trailer tire resistance and trailer wind resistance cancel out. The resistance from the trailer tires is proportional to the weight of the trailer 105 and the level of inflation of the tires. The tire resistance does not vary with the speed of the vehicle 100. However, the wind resistance, B, varies with the speed of the vehicle 100, wind velocity, and a geometric profile of the trailer 105. Therefore, for EQN. 3 to produce an accurate calculation of the weight of the trailer 105, the wind resistance during the vehicle 100 acceleration and the wind resistance during the vehicle 100 deceleration must be equal (or approximately equal) to properly cancel. As such, for EQN. 3 to be accurate, the ESC system uses force readings which correspond to the same vehicle 100 speeds and wind speeds (and directions). Accordingly, the force readings from the intelligent fastener sensors 415 that are used to determine the weight of the trailer 105 correspond to equal (or approximately equal) values of acceleration and deceleration, vehicle speed, and wind speed. Although the calculation of trailer weight is described above with respect to accelerations and decelerations with values of $0.1*g$, the ESC system also uses different acceleration values to determine the weight of the trailer 105.

In alternative embodiments, a simplified calculation is performed in which only corresponding vehicle speeds and accelerations/decelerations are used to determine trailer weight (i.e., factors such as wind speed are not considered). As such, the calculation of the weight of the trailer 105 includes an inherent error. The error is removed or mitigated from the weight calculation by performing a plurality of trailer weight calculations. The variance in the weight calculations which results from the wind resistance, in most instances, is relatively small when compared to the inertia of the trailer 105. Therefore, by making several calculations of trailer weight and averaging the results, the affect that a varying wind resistance has on the value of the trailer weight calculation is reduced. In some embodiments, the trailer weight calculation is constantly recalculated in such a manner to continuously lessen the affect of variations in wind speed, vehicle speed, and other factors that impact the calculated trailer weight.

The weight of the trailer 105 is then used to calculate additional characteristics of the trailer 105, such as the trailer wind resistance, trailer tire resistance, trailer sway, and the height of the trailer center of gravity. As previously noted, the force on the intelligent fasteners 415 caused by wind resistance varies with the speed of the vehicle 100. The wind resistance is calculated using additional force readings from the intelligent fastener sensors 415 when the vehicle 100 is traveling at different speeds, and is therefore determined based on the difference between the intelligent fastener force readings at the different vehicle speeds. In some embodiments, the vehicle 100 also includes a wind speed sensor or multiple wind speed sensors positioned on the front and/or sides of the vehicle 100 to determine wind velocity and direction. The wind velocity is then incorporated into the calculation of the wind resistance of the trailer 105. In some embodiments, the ESC system is also configured to determine a profile for the wind resistance of the trailer 105. For example, the profile includes one or more equations which describe the force from wind resistance with respect to characteristics of the vehicle 100, such as vehicle 100 speed and wind speed. The profile is used to, among other things, estimate the wind resistance of the trailer 105, and compensate the motion of the vehicle 100 accordingly without having to continuously determine the wind resistance from intelligent fastener force readings. The tire resistance is calculated based on the trailer 105 weight, or after the wind resistance has been calculated.

The sway (i.e., left and right movement) of the trailer 105 is also determined based on the force readings from the intelligent fasteners 415. The sway of the trailer 105 is related to a difference between the forces sensed by the first and second intelligent fasteners 235 and 260 (see FIGS. 6 and 7). The difference between the two readings is a product of the previously calculated trailer weight and trailer sway. In one embodiment, the sway is calculated using the relationship shown in EQN. 4.

$$F_{f1} - F_{f2} = (\text{trailer weight}) * (\text{trailer sway}) \quad \text{EQN. 4}$$

where $F_{f1}$ corresponds to a force reading from the first intelligent fastener sensor 235, $F_{f2}$ corresponds to a force reading from as second intelligent fastener sensor 260, and $F_{f1}-F_{f2}$ is the difference or differential force between the first and second intelligent fastener sensors 235 and 260. As such, the trailer sway is calculated as shown below in EQN. 5.

$$(\text{trailer sway}) = \frac{F_{f1} - F_{f2}}{(\text{trailer weight})} \quad \text{EQN. 5}$$

The center of gravity of the trailer 105 is determined based on force readings from the third intelligent fastener sensor 325 and characteristics of the vehicle 100's motion. For example, a torque from a force on the trailer hitch ball 230 is dependent upon a vehicle turn radius, turning speed (i.e., vehicle speed during a turn), trailer weight, trailer center of gravity (e.g., the height of the center of gravity), and lateral forces such as a crosswind. The turning radius of the vehicle 100 is determined using, for example, the steering wheel angle sensor 120 or wheel angle sensors (e.g., on the left front and right front wheels). The turning speed of the vehicle 100 is determined using the wheel speed sensors 120A-120D, lateral forces on the vehicle 100 are determined using, for example, crosswind sensors positioned on the sides of the vehicle 100, and the weight of the trailer 105 was previously calculated. In some embodiments, the lateral forces on the vehicle 100 are determined directly using difference sensors, or indirectly by the ESC system based on a result of the lateral forces on the vehicle 100 or trailer 105 (e.g., a yaw rate). Therefore, the location of the center of gravity of the trailer 105 is the only unknown variable which affects the torque at the trailer hitch 320, and is calculated by the ESC system.

In other embodiments of the invention, the force readings from the intelligent fastener sensors 415 are used to calculate additional characteristics of the trailer 105 and the trailer load which are used to compensate the motion of the vehicle 100. In one such embodiment, the force readings from the intelligent fastener sensors 415 are then used to determine if the trailer 105 is unevenly loaded. For example, if the trailer 105 is hauling a heavy load and the weight of the load is not balanced (e.g., more weight is on either the right side or the left side of the trailer 105) the center of gravity of the trailer 105 is not centered and a difference between the forces at the first and second intelligent fastener sensors 235 and 260 is detected. The unbalanced trailer load also produces a torque, and affects the motion of the vehicle 100 in a manner similar to trailer sway when the vehicle 100 is turning. As described in greater detail below, when such a difference in intelligent fastener forces is detected, torque and/or braking control are used to compensate the motion of the vehicle 100.

In another embodiment, the force readings from the intelligent fastener sensors 415 are used to detect a sudden change in the weight of the trailer load. The calculated trailer weight is susceptible to variations in force readings when calculated in the above described manner. Factors such as, for example, wind gusts, increased road friction, and decreased road friction affect the calculated weight of the trailer 105. However, the resultant variations in calculated weight are averaged out or overwritten by subsequent weight calculations. As such, the variations in the weight calculations are temporary. If, however, a fluctuation in the calculated trailer weight persists over several iterations of calculated trailer weight, the difference is indicative of a new trailer load which is lighter than a previous trailer load. Such a difference indicates that all or a portion of a load on the trailer 105 is no longer present (e.g., has fallen off of the trailer 105). In such a situation, a driver receives a visual notification, an audible notification, or a combination of visual and audible notifications which indicate the abrupt change in trailer 105 weight.

Figure 11:
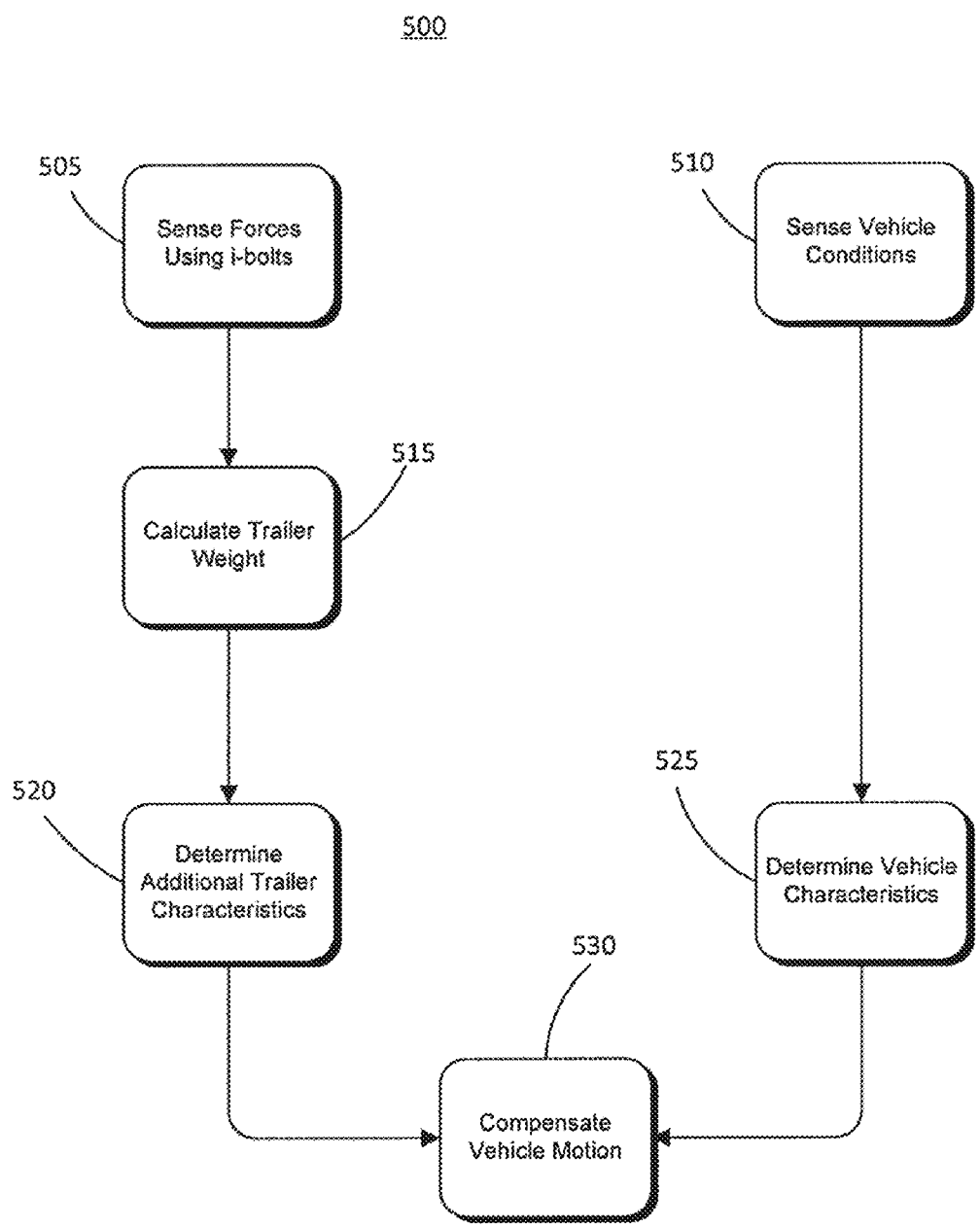
FIG. 11 is a process for determining a characteristic of the vehicle.

The calculated characteristics of the trailer 105 are used in combination with the information provided to the ECU 125 from the other vehicle sensors 410 to compensate the motion of the vehicle 100 as necessary. For example, the process 500 illustrated in FIG. 11 includes the steps of sensing forces at the first junction 225 using the intelligent fastener sensors 415 (step 505) and sending signals representative of the sensed forces to the ECU 125. In parallel with sensing forces using the intelligent fastener sensors 415, the other vehicle sensors (e.g., yaw rate sensor 135, lateral acceleration sensor 140, wheel speed sensors 120A-120D, torque sensor 150, etc.) sense other conditions of the vehicle 100 (step 510) and send signals indicative of those conditions to the ECU 125. After the intelligent fastener sensors 415 have sensed the forces at the first junction 225, the weight of the trailer 105 is calculated (step 515). Following the calculation of trailer weight, additional trailer characteristics such as sway, wind resistance and tire resistance are determined or calculated by the ECU 125 (step 520). The ECU 125 also determines or calculates vehicle 100 characteristics based on the signals from the vehicle sensors 410 (step 525). Based on the calculated vehicle 100 and trailer 105 characteristics, the ESC system compensates the motion of the vehicle 100 as described below.

Referring again to FIG. 10, the trailer load compensation module 430 generates a compensation factor based on requirements of the vehicle control system 440. For example, the compensation factor determines a plurality of engine torque parameters or values, front steering torque parameters or values, rear steering torque parameters or values, and brake torque parameters or values based on the trailer and vehicle characteristics described above. In some embodiments, the vehicle control system 440 is configured to control front and rear steering torque. In other embodiments, the vehicle control system 440 is configured to control engine torque and braking torque. In still other embodiments, the vehicle control system 440 is configured to control front and rear steering torque, engine torque, and braking torque. In such embodiments, the compensation factor includes front and rear steering torque parameters, engine torque parameters, and brake torque parameters.

In one embodiment, the trailer load compensation module 430 generates a compensation factor or signal which is received by the torque distribution module 435. The torque distribution module 435 distributes the compensation factor or signal among the engine torque control module 445, the brake torque control module 450, the front steering torque control module 455, and the rear steering torque control module 460 described above. In some embodiments, the trailer load compensation module 430 acts as a feedback to the vehicle control system 440. Although the compensation system 400 is shown as an external module to the vehicle control system 440, in some embodiments the compensation system 400 is internal to the vehicle control system 440.

The calculated trailer characteristics are also used to control other features and functions of the vehicle 100. In one embodiment, the weight of the trailer 105, the wind resistance of the trailer 105, and the tire resistance of the trailer 105 are calculated in the ECU 125 based on the force readings from the intelligent fastener sensors 415 to determine the trailer characteristics described above. The ECU 125 then uses the calculated trailer and vehicle characteristics (e.g., speed, yaw rate, wheel slip, wind speed, applied torque, etc.) to generate a control function for the vehicle 100 which maximizes the fuel economy of the vehicle 100 when towing the trailer 105. For example, most ESC systems are designed to optimize the control and performance of a vehicle 100, but the effects of towing a trailer reduce the performance of the vehicle 100 when the ESC system does not accurately determine trailer characteristics. By calculating the weight, wind resistance, and tire resistance of a trailer 105 (i.e., the three trailer characteristics that have the greatest affect on vehicle fuel economy when towing the trailer 105), the ESC system is able to generate a control function which outputs an optimal driving speed for maximizing vehicle fuel economy while towing the trailer 105. In some embodiments, the ideal driving speed is provided to the driver in a heads-up display. In other embodiments, when a vehicle 100 is traveling with a cruise control engaged (e.g., an adaptive cruise control), the ECU 125 automatically adjusts the vehicle 100 speed to the ideal driving speed. The ECU 125 is also capable of controlling torque differentials, braking control, and steering control to maximize fuel economy based on the trailer characteristics.

Thus, the invention provides, among other things, a system and method for determining a plurality of trailer characteristics based on forces sensed at a junction between a vehicle and a trailer. The forces are sensed using one or more intelligent bolts which are connected to an electronic stability control system. The electronic stability control system compensates the motion of the vehicle based on the sensed forces and the trailer characteristics. Various features and advantages of the invention are set forth in the following claims.

What is claimed is:

1. A method of determining a plurality of characteristics of a trailer being towed by a vehicle that includes an electronic stability control system, the method comprising:
    sensing a plurality of vehicle conditions using sensors connected to the electronic stability control system;
    measuring a first force at a first junction of a vehicle trailer hitch with an intelligent fastener;
    measuring a second force at the first junction of the vehicle trailer hitch,
    wherein the first and second forces are in a longitudinal direction with respect to the vehicle;
    determining, by the electronic stability control system, a first characteristic of the trailer based on the first force and the second force, the first characteristic being one of a trailer center of gravity, a wind-resistance-geometric profile of the trailer, and a resistive force experienced by the trailer's tires; and
    compensating, by the electronic stability control system, the motion of the vehicle based on the first characteristic of the trailer and the plurality of vehicle conditions.

2. The method of claim 1, wherein the first characteristic of the trailer is a weight of the trailer.

3. The method of claim 1, wherein the first characteristic of the trailer is a sway of the trailer.

4. The method of claim 1, wherein measuring the first and second forces is accomplished using the intelligent fastener.

5. The method of claim 1, wherein the first characteristic of the trailer is a center of gravity of the trailer.

6. The method of claim 1, wherein the plurality of vehicle conditions include a speed of the vehicle.

7. The method of claim 1, wherein the first characteristic of the trailer is a torque at the trailer hitch caused by the trailer.

8. A system for determining a plurality of characteristics of a trailer being towed by a vehicle, the system comprising:
    a plurality of sensors configured to sense a plurality of conditions of the vehicle;
    a first fastening device configured to measure a first longitudinal force and a second longitudinal force at a first junction between the vehicle and a vehicle trailer hitch; and
    a control system configured to receive signals indicative of the first and second forces from the first fastening device and signals indicative of the plurality of conditions of the vehicle from the plurality of sensors,
    wherein the control system determines a first characteristic of the trailer based on the first force and the second force, the first characteristic being one of a trailer center of gravity, a wind-resistance-geometric profile of the trailer, and a resistive force experienced by the trailer's tires, and
    wherein the control system compensates the motion of the vehicle based on the first characteristic of the trailer and the plurality of vehicle conditions.

9. The system of claim 8, wherein the first characteristic of the trailer is a weight of the trailer.

10. The system of claim 8, wherein the first characteristic of the trailer is a sway of the trailer.

11. The system of claim 8, wherein the longitudinal direction is with respect to the vehicle.

12. The system of claim 8, wherein the plurality of vehicle conditions include a speed of the vehicle.

13. The system of claim 8, wherein the first characteristic of the trailer is a torque at the first junction.

14. A method of determining a plurality of characteristics of a trailer being towed by a vehicle that includes an electronic stability control system, the method comprising:

sensing a plurality of vehicle conditions using sensors connected to the electronic stability control system;

measuring a first force at a first junction between the vehicle and the trailer with an intelligent fastener;

measuring a second force at the first junction between the vehicle and the trailer, wherein the first and second forces are in a longitudinal direction with respect to the vehicle;

determining, by the electronic stability control system, a first characteristic of the trailer based on the first force and the second force, the first characteristic being one of a trailer center of gravity, a wind-resistance-geometric profile of the trailer, and a resistive force experienced by the trailer's tires; and compensating, by the electronic stability control system, the motion of the vehicle based on the first characteristic of the trailer and the plurality of vehicle conditions.

15. The method of claim 14, wherein the first characteristic of the trailer is a center of gravity of the trailer.

16. The method of claim 14, wherein the first characteristic of the trailer is a sway of the trailer.

17. The method of claim 14, wherein the first junction includes at least one bolt for measuring the first and second forces.

18. The method of claim 14, wherein the first characteristic of the trailer is a weight of the trailer.

19. The method of claim 14, wherein the plurality of vehicle conditions include a speed of the vehicle.

20. The method of claim 14, wherein the characteristic of the trailer is a torque at the trailer hitch caused by the trailer.

* * * * *